US012287597B2

(12) United States Patent
Endo

(10) Patent No.: US 12,287,597 B2
(45) Date of Patent: Apr. 29, 2025

(54) HEATING UNIT WITH HEATING ELEMENTS AT DIFFERENT POSITIONS AND IMAGE PROCESSING APPARATUS WITH HEATING UNIT

(71) Applicant: Toshiba Tec Kabushiki Kaisha, Tokyo (JP)

(72) Inventor: Sasuke Endo, Chigasaki Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/485,524

(22) Filed: Oct. 12, 2023

(65) Prior Publication Data

US 2024/0036502 A1 Feb. 1, 2024

Related U.S. Application Data

(63) Continuation of application No. 17/672,124, filed on Feb. 15, 2022, now Pat. No. 11,822,272, which is a (Continued)

(30) Foreign Application Priority Data

Nov. 7, 2019 (JP) ................................ 2019-202278

(51) Int. Cl.
*G03G 15/20* (2006.01)

(52) U.S. Cl.
CPC ..... *G03G 15/2053* (2013.01); *G03G 15/2039* (2013.01); *G03G 15/2064* (2013.01); *G03G 2215/2032* (2013.01)

(58) Field of Classification Search
USPC ........................................................ 399/328
See application file for complete search history.

(56) References Cited

U.S. PATENT DOCUMENTS 6,455,811 B2 9/2002 Otsuka
8,669,495 B2 3/2014 Makihira
(Continued)

FOREIGN PATENT DOCUMENTS

CN 105093885 A 11/2015
EP 1174775 A1 1/2002
(Continued)

OTHER PUBLICATIONS

Japanese Office Action dated Aug. 8, 2023, mailed in counterpart Japanese Application No. 2019-202278, 8 pages (with translation).
(Continued)

*Primary Examiner* — Quana Grainger
(74) *Attorney, Agent, or Firm* — Kim & Stewart LLP

(57) ABSTRACT

A heating unit includes a cylinder which rotates about an axis parallel to a first direction. A heater has a first surface abutting on an inner surface of the cylinder at a nip position. A support member is on a second surface of the heater and also contacts the cylinder. A first heating element is in the heater at a first position along the first direction. A second heating element in the heater is at a second position spaced from the first position. A first temperature sensor is above the first position. A locking portion of the heater is at a third position along the first direction. The locking portion engages the support member and restricts movement of the heater in the first direction. The first position is near a first outer edge of the cylinder. The second position is closer to a central portion of the cylinder.

20 Claims, 12 Drawing Sheets

Related U.S. Application Data continuation of application No. 16/991,928, filed on Aug. 12, 2020, now Pat. No. 11,281,137.

(56) References Cited

U.S. PATENT DOCUMENTS

| | | | |
|---|---|---|---|
| 9,229,388 | B2 | 1/2016 | Imaizumi |
| 11,281,137 | B2 | 3/2022 | Endo |
| 11,550,249 | B2 | 1/2023 | Furuichi |
| 2002/0011476 | A1 | 1/2002 | Otsuka |
| 2006/0024071 | A1 | 2/2006 | Takami |
| 2014/0186078 | A1 | 7/2014 | Imaizumi |
| 2015/0023704 | A1 | 1/2015 | Imaizumi |
| 2015/0338795 | A1 | 11/2015 | Yamaguchi |
| 2015/0338804 | A1 | 11/2015 | Nakashima |
| 2016/0098001 | A1 | 4/2016 | Ogawa |
| 2016/0252856 | A1 | 9/2016 | Suzuki |
| 2019/0286028 | A1 | 9/2019 | Furuichi |
| 2022/0171316 | A1 | 6/2022 | Endo |

FOREIGN PATENT DOCUMENTS

| | | | |
|---|---|---|---|
| JP | 2014130241 | A | 7/2014 |
| JP | 2017049618 | A | 3/2017 |
| JP | 2017092039 | A | 5/2017 |
| JP | 2019164996 | A | 9/2019 |
| JP | 2020052345 | A | 4/2020 |

OTHER PUBLICATIONS

Extended European Search Report dated Feb. 22, 2021, mailed in counterpart European Application No. 20196905.2, 11 pages.

Chinese Office Action dated Jun. 21, 2024, mailed in counterpart Chinese Application No. 202010940110.1, 12 pages (with translation).

HEATING UNIT WITH HEATING ELEMENTS AT DIFFERENT POSITIONS AND IMAGE PROCESSING APPARATUS WITH HEATING UNIT

CROSS-REFERENCE TO RELATED APPLICATIONS

This application is a continuation of U.S. patent application Ser. No. 17/672,124, filed Feb. 15, 2022, which is a continuation of U.S. patent application Ser. No. 16/991,928, filed Aug. 12, 2020, now U.S. Pat. No. 11,281,137, granted Mar. 22, 2022, which is based upon and claims the benefit of priority from Japanese Patent Application No. 2019-202278, filed on Nov. 7, 2019, the entire contents of each of which are incorporated herein by reference.

FIELD

Embodiments described herein relate generally to a heating unit and an image processing apparatus.

BACKGROUND

An image forming apparatus that forms an image on a sheet is known. The image forming apparatus of this type includes a heating unit for fixing a toner (or other recording agent) to a sheet. It is required to appropriately control heating units to properly control the heating temperature used for fixing the toner image (or the like) to the sheet.

DETAILED DESCRIPTION

According to an embodiment, a heating unit comprises a cylindrical film having a length in a first direction. The cylindrical film is configured to rotate about an axis parallel to the first direction. An outer surface of the cylindrical film is configured to abut against a pressing roller and form a sheet nip. A heater extends in the first direction and has a first surface abutting on an inner surface of the cylindrical film at the sheet nip. The heater has a second surface opposite to the first surface. A support member is on the second surface of the heater. The support member includes a portion contacting the inner surface of the cylindrical film. A first heating element is in the heater at a first position along the first direction. The first heating element extends in the first direction over a first range. A second heating element is in the heater at a second position along the first direction that is spaced from the first position. The second heating element extends in the first direction over a second range not overlapping with the first range. A first temperature sensor is above the first position in a second direction orthogonal to the first direction. A locking portion of the heater is at a third position along the first direction. The locking portion is configured to engage a portion of the support member to restrict movement of the heater relative to the support member in the first direction. The first position is proximate a first outer edge of the cylindrical film. The second position is closer to a central portion of the cylindrical film. The first position is between the second and third positions in the first direction.

Hereinafter, an example of a heating unit and an image processing apparatus according to an embodiment will be described with reference to the drawings.

Figure 1:
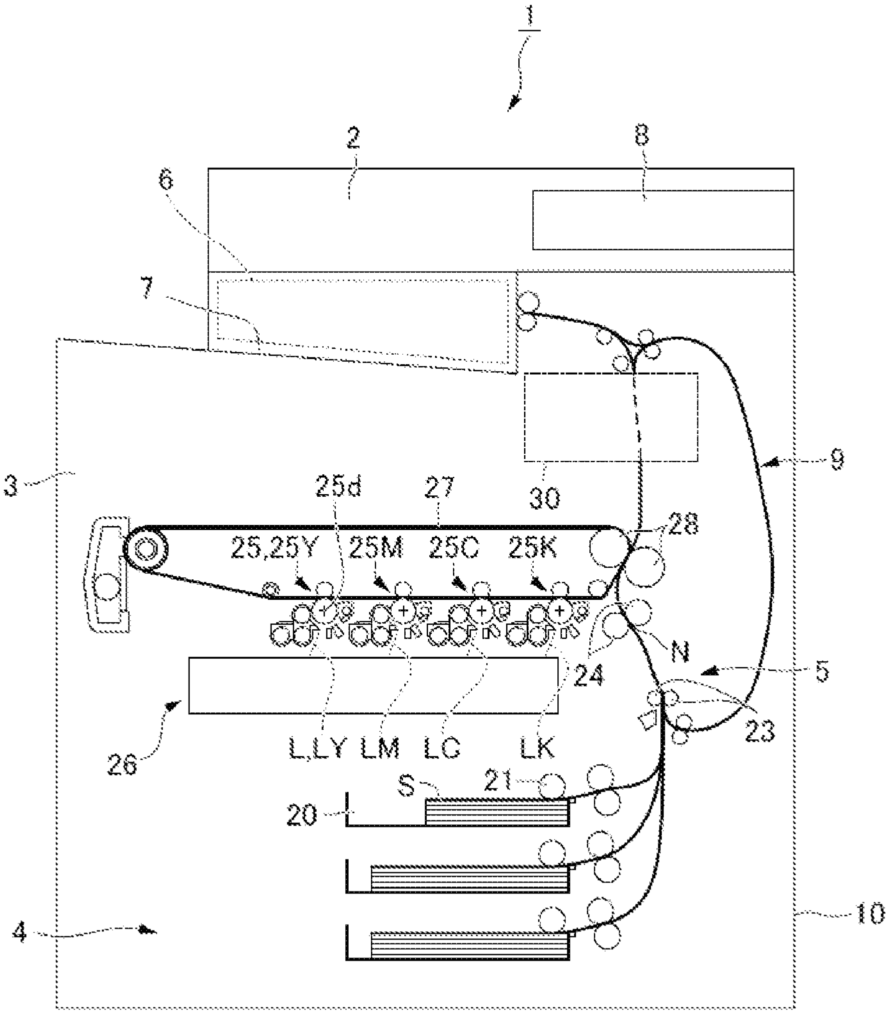
FIG. 1 is a schematic diagram of an image processing apparatus according to an embodiment.

FIG. 1 is a schematic diagram of an image processing apparatus according to an embodiment. The image processing apparatus according to the embodiment is an image forming apparatus 1. The image forming apparatus 1 performs a process of forming an image on a sheet S. In this example, sheet S is paper.

The image forming apparatus 1 includes a housing 10, a scanner unit 2, an image forming unit 3, a sheet supply unit 4, a conveying unit 5, a sheet discharge tray 7, an inversion unit 9, a control panel 8, and a controller 6.

The housing 10 forms an outer casing of the image forming apparatus 1.

The scanner unit 2 reads image information of a copy target as brightness and darkness of reflected light, and generates an image signal accordingly. The scanner unit 2 outputs the generated image signal to the image forming unit 3.

The image forming unit 3 forms an image by using a recording agent, such as toner, on the basis of the image signal received from the scanner unit 2 or an image signal received from the outside. The image formed by the image forming unit 3 is referred to as a toner image in this context. The image forming unit 3 transfers the toner image to the surface of a sheet S. The image forming unit 3 then heats and presses the toner image on the surface of the sheet S, and thus fixes the toner image to the sheet S.

The sheet supply unit 4 supplies the sheets S one by one to the conveying unit 5 in accordance with the timing at which the image forming unit 3 forms a toner image. The sheet supply unit 4 has an accommodating portion 20 and a pickup roller 21.

The accommodating portion 20 houses sheets S of a predetermined size and type.

The pickup roller 21 picks up the sheets S one by one from the accommodating portion 20. The pickup roller 21 supplies the taken-out sheet S to the conveying unit 5.

The conveying unit 5 conveys the sheet S from the sheet supply unit 4 to the image forming unit 3. The conveying unit 5 includes a conveying roller 23 and a registration roller 24.

The conveying roller 23 conveys the sheet S from the pickup roller 21 to the registration roller 24. The conveying roller 23 makes a leading end of the sheet S (with respect to the conveyance direction) abut against a nip N of the registration roller 24.

The registration roller 24 bends the sheet S at the nip N, thereby adjusting the position of the leading end of the sheet S in the conveyance direction. The registration roller 24 conveys the sheet S in accordance with the timing at which the image forming unit 3 transfers the toner image to the sheet S.

The image forming unit 3 includes a plurality of image forming portions 25, a laser scanning unit 26, an intermediate transfer belt 27, a transfer unit 28, and a fixing unit 30.

The image forming portion 25 includes a photosensitive drum 25*d*. The image forming portion 25 forms a toner image in accordance with an image signal from the scanner unit 2 or the outside on the photosensitive drum 25*d*. The plurality of image forming portions 25Y, 25M, 25C, and 25K form toner images of yellow, magenta, cyan, and black toner, respectively.

A charger, a developing device, and the like are disposed around the photosensitive drum 25*d*. The charger charges a surface of the photosensitive drum 25*d*. The developing device contains a developer containing yellow, magenta, cyan, and black toners. The developing device develops the electrostatic latent image on the photosensitive drum 25*d*. As a result, toner images formed by the toners of the respective colors are formed on the photosensitive drum 25*d*.

The laser scanning unit 26 scans the charged photosensitive drum 25*d* with a laser beam L, and exposes the photosensitive drum 25*d*. The laser scanning unit 26 exposes the photosensitive drums 25*d* of the image forming portions 25Y, 25M, 25C, and 25K of respective colors with respective different laser beams LY, LM, LC, and LK. Accordingly, the laser scanning unit 26 forms an electrostatic latent image on the photosensitive drum 25*d*.

The toner image on the surface of the photosensitive drum 25*d* is first transferred to the intermediate transfer belt 27. The transfer unit 28 transfers the toner image first transferred onto the intermediate transfer belt 27 to the surface of the sheet S at a secondary transfer position.

The fixing unit 30 heats and presses the toner image transferred to the sheet S, and fixes the toner image to the sheet S. The fixing unit 30 will be described in detail later.

The inversion unit 9 inverts the sheet S to form an image on a back surface of the sheet S. The inversion unit 9 reverses the sheet S discharged from the fixing unit 30 by switchback. The inversion unit 9 conveys the inverted sheet S toward the registration roller 24.

The sheet discharge tray 7 stores the sheet S on which an image has been formed and discharged.

The control panel 8 is a part of an input unit for an operator to input information for operating the image forming apparatus 1. The control panel 8 includes a touch panel and various kinds of hard keys.

The controller 6 controls respective components of the image forming apparatus 1. Details of the controller 6 will be described later.

Figure 2:
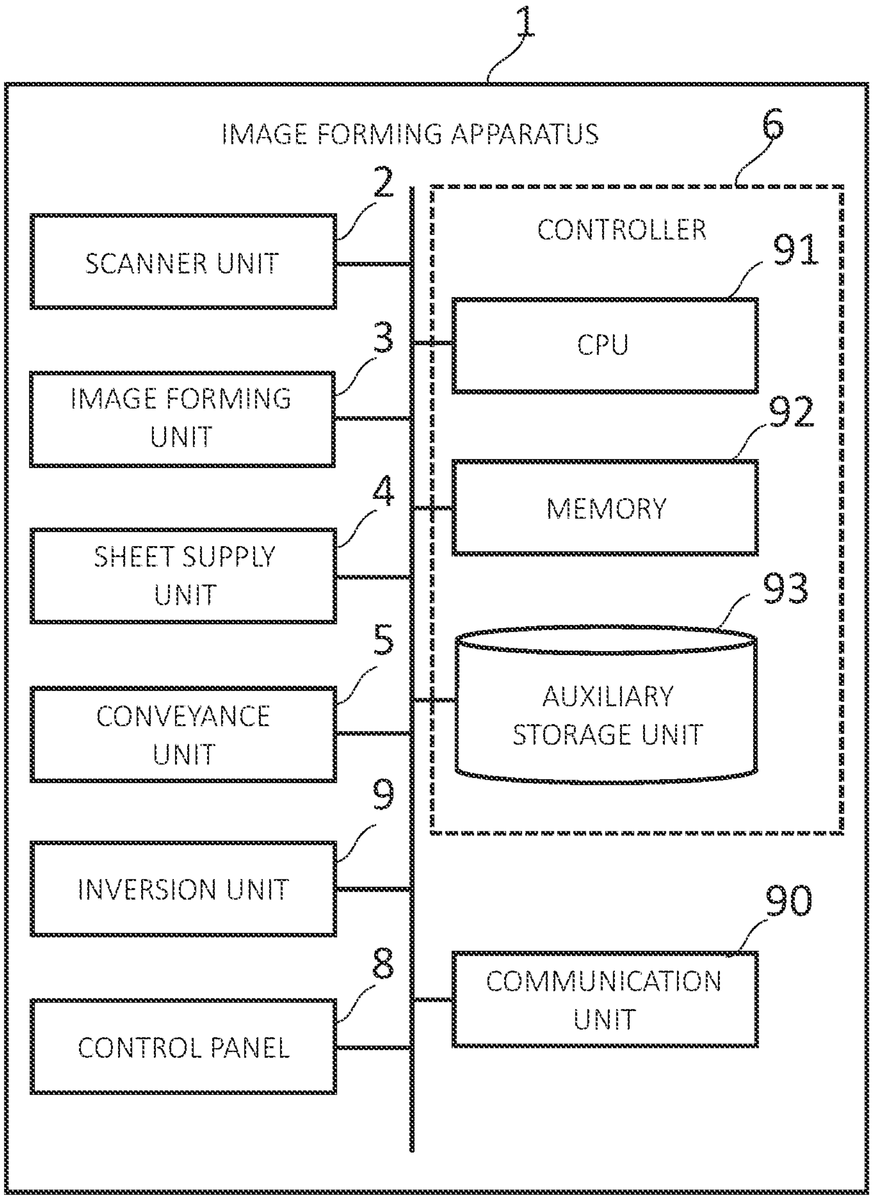
FIG. 2 depicts hardware configuration aspects of an image processing apparatus according to an embodiment.

FIG. 2 is a hardware configuration diagram of the image processing apparatus according to the embodiment. The image forming apparatus 1 includes a central processing unit (CPU) 91, a memory 92, an auxiliary storage device 93, and the like connected by a bus, and executes a program. The image forming apparatus 1 functions as an apparatus having a scanner unit 2, an image forming unit 3, a sheet supply unit 4, a conveying unit 5, an inversion unit 9, a control panel 8, and a communication unit 90 by executing a program.

The CPU 91 functions as the controller 6 by executing a program stored in the memory 92 and the auxiliary storage device 93. The controller 6 controls the operation of each functional unit of the image forming apparatus 1.

The auxiliary storage device 93 is configured by using a storage device such as a magnetic hard disk device or a semiconductor storage device. The auxiliary storage device 93 stores information.

The communication unit 90 includes a communication interface for connecting its own device to an external device. The communication unit 90 communicates with the external device via the communication interface.

The fixing unit 30 will be described in detail.

Figure 3:
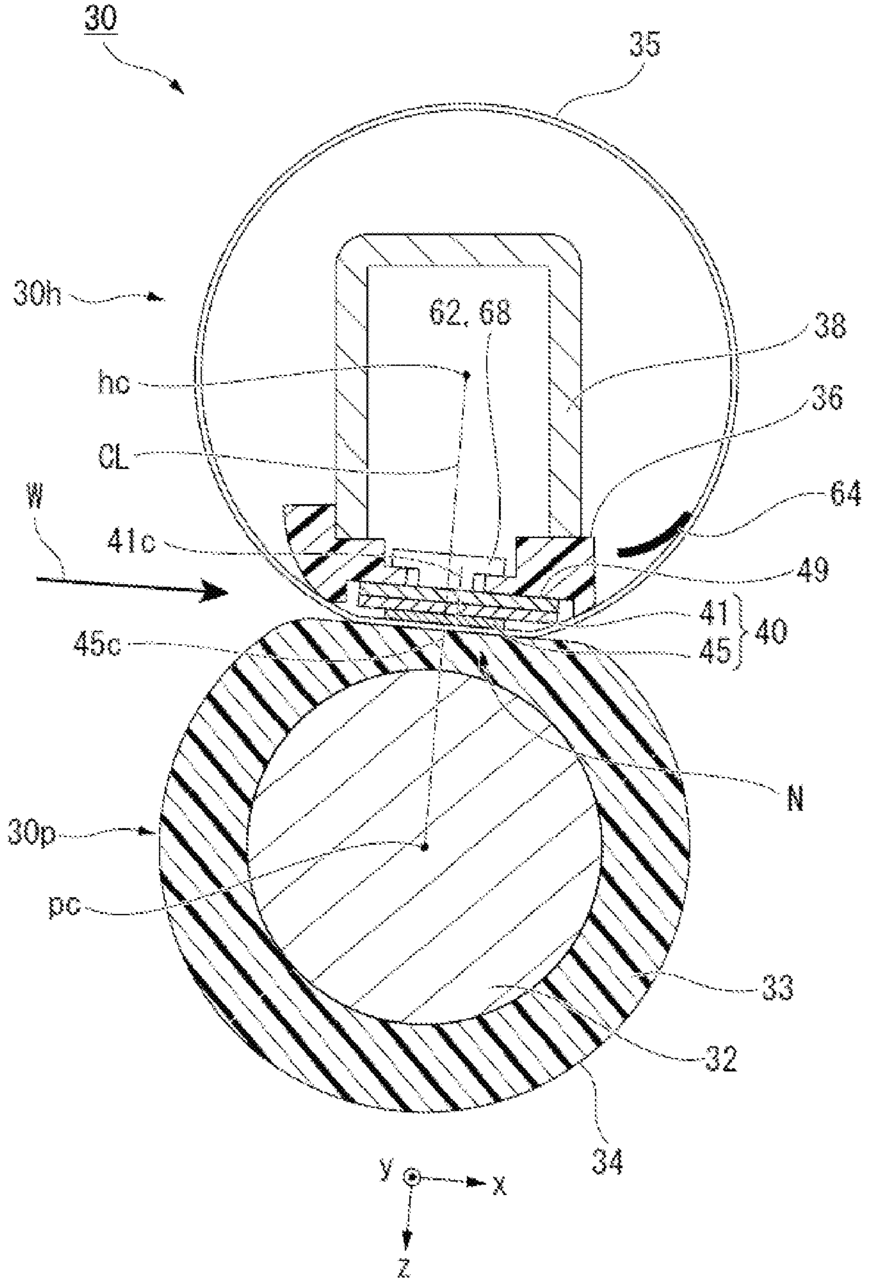
FIG. 3 is a cross-sectional view of a heating unit of an embodiment.

FIG. 3 is a front cross-sectional view of the heating unit according to the embodiment. The heating unit according to the embodiment is a fixing unit 30. The fixing unit 30 includes a pressing roller 30*p* and a film unit 30*h*.

The pressing roller 30*p* forms a nip N with the film unit 30*h*. The pressing roller 30*p* presses the toner image on the sheet S that has entered the nip N. The pressing roller 30*p* rotates to convey the sheet S. The pressing roller 30*p* includes a core metal 32, an elastic layer 33, and a release layer 34.

The core metal 32 is formed into a columnar shape by a metal material such as stainless steel. Both end portions in the axial direction of the core metal 32 are rotatably supported. The core metal 32 is rotationally driven by a motor or the like. The core metal 32 abuts against a cam member or the like. The cam member rotates so as to move the core metal 32 closer to and farther away from the film unit 30*h*.

The elastic layer 33 is formed of an elastic material such as silicone rubber. The elastic layer 33 is formed to have a constant thickness on an outer circumferential surface of the core metal 32.

The release layer 34 is formed of a resin material such as PFA (tetrafluoroethylene-perfluoroalkyl vinyl ether copolymer). The release layer 34 is formed on an outer peripheral surface of the elastic layer 33.

For example, when the outer diameter of the pressing roller 30*p* is 20 mm to 40 mm, it is preferable that the outer diameter of the core metal 32 is set to be from 10 mm to 20 mm, the thickness of the elastic layer 33 is set to be from 5 mm to 20 mm, and the thickness of the release layer 34 is set to be from 20 μm to 40 μm.

The hardness of the outer peripheral surface of the pressing roller 30*p* is preferably 40 to 70 at a load of 9.8N in an ASKER-C hardness meter. Thereby, the area of the nip N and durability of the pressing roller 30*p* are ensured.

The pressing roller 30*p* can move closer to and away from the film unit 30*h* by the rotation of the cam member. When the pressing roller 30*p* is brought close to the film unit 30*h* and pressed by a pressing spring, the nip N is formed. On the other hand, when a jam occurs in the sheet S in the fixing unit 30, the pressing roller 30*p* is moved away from the film unit 30*h*, so that it is possible to remove the sheet S. Further, when the pressing roller 30*p* is separated from the film unit 30*h* in a state where the cylindrical film 35 is stopped during sleep, the plastic deformation of the cylindrical film 35 can be prevented from being deformed.

The pressing roller 30*p* rotates by being driven to rotate by a motor. When the pressing roller 30*p* rotates in a state where the nip N is formed, the cylindrical film 35 of the film unit 30*h* rotates in a driven manner. The pressing roller 30*p* rotates in a state where the sheet S is disposed at the nip N, and thereby conveying the sheet S in the conveyance direction W.

The film unit 30*h* heats the toner image of the sheet S that has entered the nip N. As illustrated in FIG. The film unit includes a cylindrical film 35, a heater unit 40, a heat conductor 49, a support member 36, a stay 38, a heater temperature sensor 62, a thermostat 68, and a film temperature sensor 64.

The cylindrical film 35 is formed in a cylindrical shape. The cylindrical film 35 has, in order from the inner peripheral side, a base layer, an elastic layer, and a release layer. The base layer is formed of a material such as nickel (Ni) in a tubular shape. The elastic layer is laminated on an outer peripheral surface of the base layer. The elastic layer is formed of an elastic material such as silicone rubber. The release layer is laminated on the outer peripheral surface of the elastic layer. The release layer is formed of a material such as a PFA resin.

In order to shorten warm-up time, the thicknesses of the elastic layer and the release layer are preferably set so as to prevent the respective heat capacities from being excessively large. For example, in the case where the inner diameter of the cylindrical film 35 is 20 mm to 40 mm, the thickness of the base layer may be set to 30 μm to 50 μm, the thickness of the elastic layer may be set to 100 μm to 300 μm, and the thickness of the release layer may be set to 20 μm to 40 μm. A coating may be applied to the inner side of the base layer so as to improve friction sliding properties with the heater unit 40.

Figure 4:
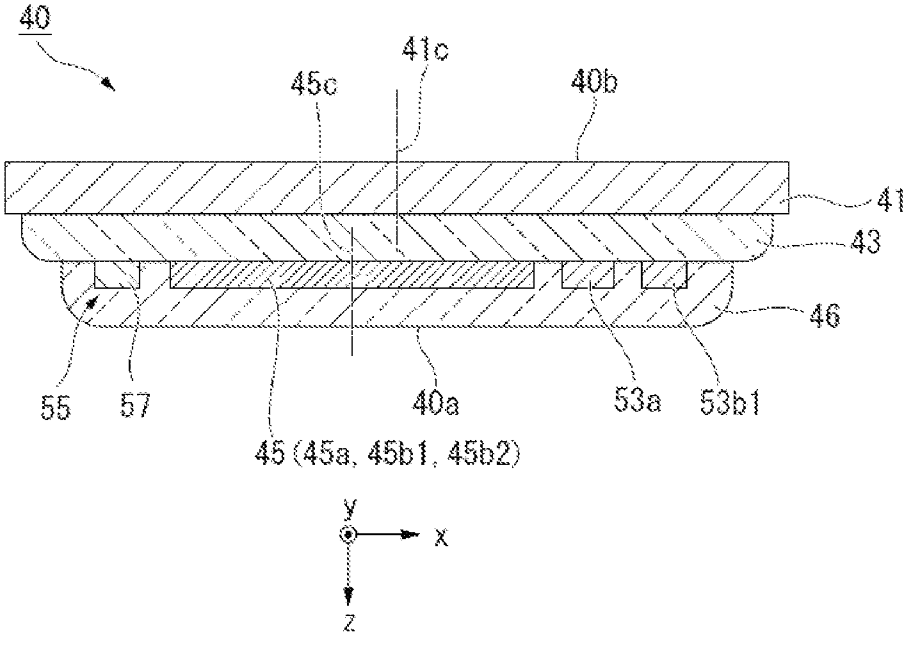
FIG. 4 is a cross-sectional view of a heater unit of a heating unit of an embodiment.
Figure 5:
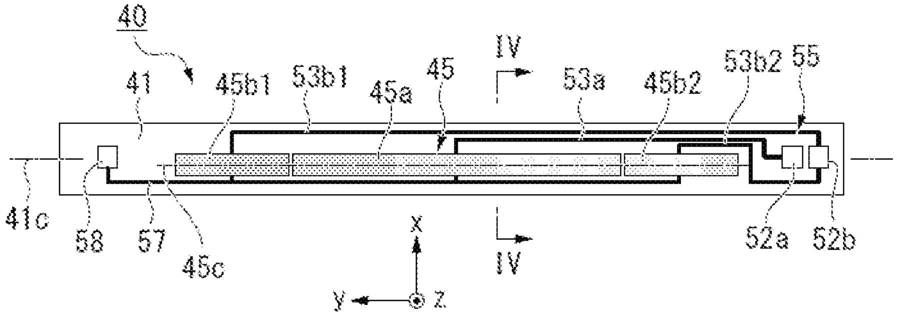
FIG. 5 is a bottom view of a heater unit.

FIG. 4 is a front cross-sectional view of the heater unit taken along line IV-IV in FIG. 5. FIG. 5 is a bottom view (a view from the +z direction) of the heater unit. The heater unit 40 includes a substrate (heating element substrate) 41, a heating element group 45, and a wiring group 55.

The substrate 41 is formed of a metal material such as stainless steel, a ceramic material such as aluminum nitride, or the like. The substrate 41 is formed in a plate shape having an elongated rectangular shape. The substrate 41 is disposed radially inward of cylindrical film 35. In the substrate 41, an axial direction of the cylindrical film 35 is defined as a longitudinal direction.

In the present application, x direction, y direction, and z direction are defined as follows.

The y direction corresponds to the longitudinal direction (length direction) of the substrate 41 (or more broadly heater unit 40). The +y direction is a direction from a central heating element 45*a* toward a first end heating element 45*b*1.

The x direction is a short-side (width) direction of the substrate 41. The +x direction corresponds to a conveyance direction of the sheet S (in the downstream direction).

The z direction is a direction normal to the substrate 41. The +z direction side of the substrate 41 on which the heating element group 45 is disposed on the substrate 41. An insulating layer 43 is formed on the +z direction surface of substrate 41 with a glass material or the like. A surface on the +z direction side of the heater unit 40 (a first surface 40*a*) contacts the inner peripheral surface of the cylindrical film 35 (see FIG. 3). The heating element group 45 is disposed on the substrate 41. As shown in FIG. 4, the heating element group 45 is formed on a surface of the insulating layer 43 on the +z direction side. In FIG. 4, the +z direction is the downward page direction. The heating element group 45 is formed of a silver-palladium alloy or the like. The outer shape of the heating element group 45 is formed in a rectangular shape having the y direction as the longitudinal direction and the x direction as the short direction.

As shown in FIG. 5, the heating element group 45 includes a plurality of heating elements (more particularly in this example, heating elements 45*b*1, 45*a* and 45*b*2) provided along the y direction. The heating element group 45 includes a first end heating element 45*b*1, a central heating element 45*a*, and a second end heating element 45*b*2 which are arranged side by side in the y direction.

The central heating element 45*a* is disposed in a central portion of the heating element group 45 in the y direction. In some examples, the central heating element 45*a* may be configured by combining a plurality of small heating elements arranged side by side in the y direction.

The first end heating element 45*b*1 is disposed at the +y direction end of the heating element group 45*a* in the +y direction from the central heating element 45*a*.

The second end heating element 45*b*2 is in −y direction from the central heating element 45*a* to be at an end of the heating element group 45 in the −y direction.

The boundary line between the central heating element 45*a* and the first end heating element 45*b*1 is depicted as parallel with the x direction in this example. However, the boundary line between the central heating element 45*a* and the first end heating element 45*b*1 may be disposed so as to intersect with the x direction. The same applies to the boundary line between the central heating element 45*a* and the second end heating element 45*b*2.

The heating element group 45 generates heat when energized. The electrical resistance value of the central heating element 45*a* is less than the electrical resistance values of the first end heating element 45*b*1 and the second end heating element 45*b*2. The electrical resistance values of the first end heating element 45*b*1 and the second end heating element 45*b*2 are substantially the same as each other. Here, the electrical resistance value of the central heating element 45*a* is referred to as a "central resistance value A", and the electrical resistance value of the first end heating element 45*b*1 (and also of the second end heating element 45*b*2) is referred to as an "end resistance value B". For example, the ratio (A:B) between the central resistance value A and the end resistance value B is preferably in a range of 1:3 to 1:7, and more preferably in a range of 1:4 to 1:6.

A sheet S having a small width in the y direction passes through only the central portion (along the y-direction) of the fixing unit 30. In this case, the controller 6 causes only the central heating element 45*a* to generate heat. On the other hand, in the case of a sheet S having a large width in the y direction, the controller 6 causes the entirety of the heating element group 45 to generate heat. Therefore, heat generation of the central heating element 45*a* and the first end heating element 45*b*1 and the second end heating element 45*b*2 can be controlled independently of each other. Heat generation of the first end heating element 45*b*1 and the second end heating element 45*b*2 is controlled in the same manner as one another in this example.

The wiring group 55 is formed of a metal material such as silver. The wiring group 55 has a central contact 52*a*, a central wiring 53*a*, an end contact 52*b*, a first end wiring 53*b*1, a second end wiring 53*b*2, a common contact 58, and a common wiring 57.

The central contact 52*a* is arranged on the −y direction side of the heating element group 45. The central wiring 53*a* is disposed on the +x direction side of the heating element group 45. The central wiring 53*a* connects the +x direction side of the central heating element 45*a* to the central contact 52*a*.

The end contact 52*b* is arranged on the −y direction side of the central contact 52*a*.

The first end wiring **53*b*1 is arranged on the +x direction side of the heating element group 45 and on the +x direction side of the center wiring 53*a*. The first end wiring 53*b*1 connects the +x direction end side of the first end heating element and the +x direction end side of the end contact 52*b*** to each other.

The second end wiring **53*b*2 is arranged on the +x direction side of the heating element group 45 and on the −x direction side of the central wiring 53*a*. The second end wiring 53*b*2 connects the +x direction end side of the second end heating element 45*b*2 and the in the −x direction side of the end contact 52*b***.

The common contact 58 is disposed on the +y direction side of the heating element group 45.

The common wiring 57 is arranged on the −x direction side of the heating element group 45. The common wiring 57 connects the −x direction end sides of the central heating element **45*a*, the first end heating element 45*b*1 and the second end heating element 45*b*2 to the common contact 58** (at the −x direction end side).

In this way, on the +x direction side of the heating element group 45, the second end wiring **53*b*2, the central wiring 53*a*, and the first end wiring 53*b*1 are disposed. But, only the common wiring 57 is disposed on the −x direction side of the heating element group 45. Therefore, the center 45*c* of the heating element group 45 along the x direction is offset in the −x direction from the center 41*c* of the substrate 41 (see FIG. 4**).

As shown in FIG. 3, a straight line CL connects a center pc of the pressing roller **30*p* and a center hc of the film unit 30*h*. The center 41*c* of the substrate 41 is offset in the +x direction from the straight line CL. Accordingly, the substrate 41 extends in the +x direction of the nip N, and the sheet S that has passed through the nip N will be more easily peeled off from the film unit 30*h***.

The center **45*c* of the heating element group 45 is disposed on the straight line CL. The heating element group 45** is entirely contained in the region of the nip N, and is disposed to be in the center of the nip N. Accordingly, the heat distribution of the nip N becomes more uniform, and a sheet S passing through the nip N will be more uniformly heated.

As shown in FIG. 4, a heating element group 45 and a wiring group 55 are formed on a surface of the insulating layer 43 on the +z direction side. The protective layer 46 is formed of a glass material or the like so as to cover the heating element group and the wiring group 55. The protective layer 46 protects the heating element group 45 and the wiring group 55. The protective layer 46 also improves sliding between the heater unit 40 and the cylindrical film 35.

As shown in FIG. 3, the heater unit 40 is disposed inside the cylindrical film 35. Grease (not separately depicted) is applied to the inner peripheral surface of the cylindrical film 35. The heater unit 40 thus contacts the inner circumferential surface of the cylindrical film 35 via the grease. The grease is disposed between the first surface **40*a* of the heater unit 40 (see FIG. 4) and the inner peripheral surface of the cylindrical film 35. When the heater unit 40 generates heat, the viscosity of the grease decreases. Accordingly, sliding friction between the heater unit 40 and the cylindrical film 35** is lowered.

The heat conductor 49 is formed of a metal material having a high thermal conductivity such as copper. An outer shape of the heat conductor 49 is substantially equal to an outer shape of the substrate 41. The heat conductor 49 is disposed to be in contact with a surface on the −z direction side of the heater unit 40 (second surface **40*b*, see FIG. 4**).

The support member 36 is formed of a resin material such as a silicone rubber, a fluorine-based rubber, an elastic material such as a polyimide resin, polyphenylene sulfide (PPS), polyether sulfone (PES), and/or a liquid crystal polymer. The support member 36 is disposed so as to cover the −z direction side of the heater unit 40 as well as both sides of the heater unit 40 in the x direction. The support member 36 supports the heater unit 40 via the heat conductor 49. Rounded chamfers or the like are formed at both ends of the support member 36 in the x direction. The support member 36 supports the inner peripheral surface of the cylindrical film 35 at both ends in the x direction of the heater unit 40.

When the sheet S passing through the fixing unit 30 is heated, a temperature distribution is generated in the heater unit 40 in accordance with the size of the sheet S. When the heater unit 40 locally reaches a high temperature, the local temperature could exceed the heat resistance temperature of the support member 36, which is formed of a resin material. The heat conductor 49 serves to average the temperature distribution across the heater unit 40. Thereby, the heat resistance of the support member 36 is maintained.

The stay 38 is formed of a steel plate material or the like. A cross section perpendicular to the y direction of the stay 38 shows the stay 38 is formed in a U-shape. For example, the stay 38 is formed by bending a steel a plate of a thickness of 1 mm to 3 mm. The stay 38 is mounted on the −z direction side of the supporting member 36 so as to close an open portion of the U shape with the supporting member 36. The stay 38 extends in the y direction. Both ends of the stay 38 in the y direction are fixed to the housing of the image forming apparatus 1. Thereby, the film unit **30*h* is supported by the image forming apparatus 1. The stay 38 improves rigidity of the film unit 30*h*. Flanges that restrict movement of the cylindrical film 35 in the y direction are attached near both ends of the stay 38** in the y direction.

The heater temperature sensor 62 is disposed to the −z direction side of the heater unit 40 with the heat conductor 49 interposed therebetween. For example, the heater temperature sensor 62 is a thermistor. The heater temperature sensor 62 is mounted on and supported by a surface of the support member 36 facing the −z direction. A temperature sensing element of the heater temperature sensor 62 contacts the heat conductor 49 through a hole passing through the support member 36 in the z direction. The heater temperature sensor 62 measures the temperature of the heater unit 40 via the heat conductor 49.

The thermostat 68 is disposed in the same manner as the heater temperature sensor 62. The thermostat 68 is incorporated in an electric circuit, which will be described later. When the temperature of the heater unit 40 detected through the heat conductor 49 exceeds some predetermined temperature, the thermostat 68 cuts off the energization of the heating element group 45.

Figure 6:
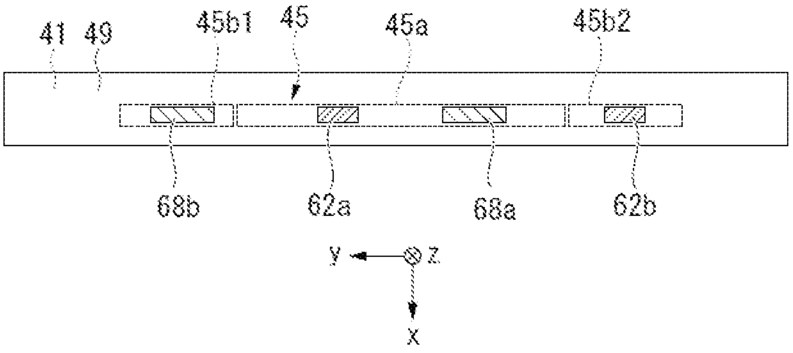
FIG. 6 is a plan view of a heater temperature sensor and a thermostat.

FIG. 6 is a plan view (a view from the −z direction) of a heater temperature sensor and a thermostat. In FIG. 6, depiction of the support member 36 is omitted. It should be noted that the following description of the heater temperature sensor, the thermostat and the film temperature sensor is intended to describe arrangement of each of the respective temperature sensing elements.

The plurality of heater temperature sensors 62 (**62*a* and 62*b*, in this example) are arranged side by side in the y direction. The plurality of heater temperature sensors 62 are disposed on the heating element group 45. The heater temperature sensors 62 are disposed within some range in the y direction of the heating element group 45. The heater temperature sensors 62 are disposed in the center of the heating element group 45 in the x direction. That is, when viewed in the z direction, the plurality of heater temperature sensors 62 and the heating element group 45** overlap at least partially.

The plurality of thermostats 68 (in this example, 68*a* and 68*b*) are also arranged in a similar manner as the plurality of heater temperature sensors 62 described above.

The plurality of heater temperature sensors 62 include a central heater temperature sensor 62*a* and an end heater temperature sensor 62*b* (a temperature sensor disposed on one end side in the longitudinal direction).

The central heater temperature sensor 62*a* measures the temperature of the central heating element 45*a*. The central heater temperature sensor 62*a* is disposed within a range to measure a temperature corresponding to the temperature of the central heating element 45*a*. That is, when viewed from the z direction, the central heater temperature sensor 62*a* and the central heating element 45*a* overlap each other.

The end heater temperature sensor 62*b* in this example measures the temperature of the second end heating element 45*b*2. As described above, the first end heating element 45*b*1 and the second end heating element 45*b*2 are similarly controlled in heat generation. Therefore, the temperature of the first end heating element 45*b*1 and the temperature of the second end heating element 45*b*2 are expected to be equal to each other (or substantially so). The end heater temperature sensor 62*b* is disposed within a range to measure a temperature corresponding to the temperature of the second end heating element 45*b*2. That is, when viewed from the z direction, the end heater temperature sensor 62*b* and the second end heating element 45*b*2 overlap each other.

The plurality of thermostats 68 similarly have a central thermostat 68*a* and an end thermostat 68*b*.

When the temperature of the central heating element exceeds the predetermined temperature, the central thermostat 68*a* cuts off the energization of the heating element group 45. The central thermostat 68*a* is located within the range of the central heating element 45*a*. That is, when viewed from the z direction, the central portion stat 68*a* and the central heating element 45*a* overlap each other.

When the temperature of the first end heating element 45*b*1 exceeds the predetermined temperature, the end thermostat 68*b* interrupts the energization of the heating element group 45. As described above, the first end heating element 45*b*1 and the second end heating element 45*b*2 are similarly controlled in heat generation. Therefore, the temperature of the first end heating element 45*b*1 and the temperature of the second end heating element 45*b*2 are considered to be equal to each other. The end thermostat 68*b* is arranged in the range of the first end heating element 45*b*1 in this example. That is, when viewed from the z direction, the end thermostat 68*b* and the first end heating element 45*b*1 overlap each other.

As described above, the central heater temperature sensor 62*a* and the thermostat 68*a* are disposed on the central heating element 45*a*. As a result, the temperature of the central heating element 45*a* can be measured and controlled. That is, when the temperature of the central heating element 45*a* exceeds the predetermined temperature, the power supply to the heating element group 45 can be cut off.

The end heater temperature sensor 62*b* is disposed on the second end heating element 45*b*2 in this example. As a result, the temperature of the second end heating element 45*b*2 can be measured and controlled. And, as noted, since the temperature of the first end heating element 45*b*1 and the temperature of the second end heating element 45*b*2 can be considered to be equal to each other, the temperature of either the first end heating element 45*b*1 or the second end heating element 45*b*2 can be measured.

The end thermostat 68*b* is disposed on the first end heating element 45*b*1 in this example. Thus, when the temperatures of the first end heating element 45*b*1 and the second end heating element 45*b*2 exceed a predetermined temperature, the energization of the heating element group 45 can be cut off.

The plurality of heater temperature sensors 62 and the plurality of thermostats 68 are arranged to alternate with one another along the y direction. As described above, the first end heating element 45*b*1 is disposed in the +y direction of the central heating element 45*a*. Within the range (that is, the planar area in the x-y plane) of this first end heating element 45*b*1, the end thermostat 68*b* is positioned. The central heater temperature sensor 62*a* is disposed in the +y direction from the center of the central heating element 45*a*. The central thermostat 68*a* is disposed in the −y direction from the center of the central heating element 45*a*. As described above, the second end heating element 45*b*2 is disposed in the −y direction of the central heating element 45*a*. Within the range of this second end heating element 45*b*2, an end heater temperature sensor 62*b* is positioned. Accordingly, from the +y direction to the −y direction, the end thermostat 68*b*, the central heater temperature sensor 62*a*, the central thermostat 68*a*, and the end heater temperature sensor 62*b* are arranged in the stated order.

Generally, a thermostat 68 connects and disconnects an electrical circuit by utilizing a bending deformation of a bimetal strip that occurs with temperature change. The thermostat can be formed to be elongated to match the shape of the bimetal strip. Further, terminals extend outward from both end portions in the longitudinal direction of the thermostat 68. The electrical connector of an external harness can be connected to the terminal by swage (swaging), crimping, riveting, or the like. Therefore, it is necessary to provide a space on an outer side in the longitudinal direction of the thermostat 68. Since there is no spatial margin in the fixing unit 30 in the x direction, the longitudinal direction of the thermostat 68 is arranged along the y direction. Thus, when a plurality of thermostats 68 are arranged side by side in the y direction, it becomes difficult to provide a connection space for an external electrical routing/connector.

As described above, the plurality of heater temperature sensors 62 and the plurality of thermostats 68 are alternately arranged along the y direction. Thereby, a heater temperature sensor 62 is disposed adjacent to a thermostat 68 in the y direction. Therefore, it is possible to provide a connection space for the external routing to the thermostat 68. Further, a degree of freedom in a layout of the thermostat 68 and the heater temperature sensor 62 in the y direction is increased. Accordingly, the thermostat 68 and the heater temperature sensor 62 may be disposed at more optimal positions, and the temperature of the fixing unit 30 may be better controlled. Furthermore, an isolation of an AC wiring connected to the plurality of thermostats 68 and an DC wiring connected to the plurality of heater temperature sensors 62 is facilitated by the present arrangement. Accordingly, generation of noise in the electric circuit(s) is suppressed.

As shown in FIG. 3, the film temperature sensor 64 is disposed inside (that is, within the interior region formed by) the cylindrical film 35 and on the +x direction side of the heater unit 40. The film temperature sensor 64 contacts the inner circumferential surface of the cylindrical film 35, and thus measures the temperature of the cylindrical film 35.

Figure 7:
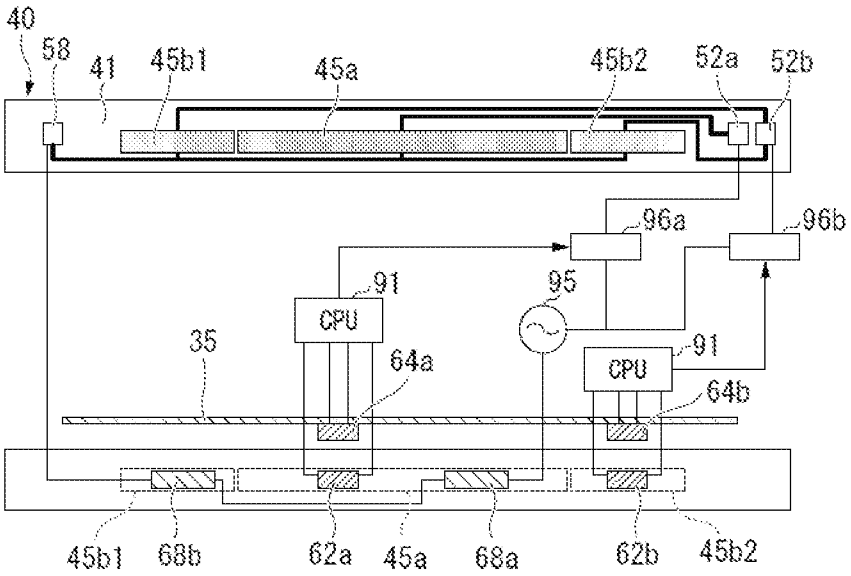
FIG. 7 is an circuit diagram of a heating unit of an embodiment.

FIG. 7 is a circuit diagram of the heating unit according to the present embodiment. In FIG. 7, the bottom view of the heater unit 40 presented in FIG. 5 is depicted in the upper portion of FIG. 7, and the plan view of the heater unit 40 presented in FIG. 6 is depicted in the lower portion of FIG. 7. FIG. 7 also illustrates the plurality of film temperature sensors 64, along with a cross sectional portion of the cylindrical film 35. The depicted plurality of film temperature sensors 64 includes a central film temperature sensor 64*a* and an end film temperature sensor 64*b*. FIG. 7 primarily depicts various wiring/electrical connections between components rather than positional relationships between these components.

The central film temperature sensor 64*a* contacts the central portion of the cylindrical film 35. The central film temperature sensor 64*a* contacts the cylindrical film 35 within a range in the y direction covered by the central heating element 45*a*. The central film temperature sensor 64*a* measures the temperature of the central portion of the cylindrical film 35.

The end film temperature sensor 64*b* contacts the −y direction end of the cylindrical film 35. The end film temperature sensor 64*b* contacts the cylindrical film 35 within the range in the y direction covered by the second end heating element 45*b*2. The end film temperature sensor 64*b* measures the temperature of the −y direction end portion of the cylindrical film 35. As described above, the first end heating element 45*b*1 and the second end heating element 45*b*2 are similarly controlled in heat generation. Therefore, the temperature of the −y direction end portion of the cylindrical film 35 and the temperature of the +y direction end portion of the cylindrical film 35 are treated as equal to each other in this context.

The power supply 95 is connected to the central contact 52*a* via a central triac 96*a*. The power supply 95 is connected to the end contact 52*b* via an end triac 96*b*. The CPU 91 controls ON/OFF of the central triac 96*a* and the end triac 96*b* independently of each other. When the CPU 91 turns on the central triac 96*a*, electric power is supplied from the power supply 95 to the central heating element 45*a*. This causes the central heating element 45*a* to generate heat. When the CPU 91 turns on the end triac 96*b*, the first end heating element 45*b*1 and the second end heating element 45*b*2 are energized from the power supply 95. This causes the first end heating element 45*b*1 and the second end heating element 45*b*2 to generate heat. As described above, the heat generation of the central heating element 45*a* and the first end heating element 45*b*1 and the second end heating element 45*b*2 can be controlled independently of each other. The central heating element 45*a*, first end heating element 45*b*1, and second end heating element 45*b*2 are connected in parallel with respect to the power supply 95.

The power supply 95 is connected to the common contact 58 via a central thermostat 68*a* and an end thermostat 68*b*. The central thermostat 68*a* and the end thermostat 68*b* are connected in series.

When the temperature of the central heating element rises abnormally, detection temperature of the central thermostat 68*a* exceeds the predetermined temperature. At this time, the central thermostat 68*a* cuts off the power supply from the power supply 95 to the entire heating element group 45.

When the temperature of the first end heating element 45*b*1 abnormally rises, the detection temperature of the end thermostat 68*b* exceeds the predetermined temperature. At this time, the end thermostat 68*b* cuts off the power supply from the power supply 95 to the entire heating element group 45. Similarly, when the temperature of the first end heating element 45*b*1 or the second end heating element 45*b*2 abnormally increases, the end thermostat 68*b* cuts off the power supply from the power supply 95 to the entirety of the heating element group 45.

The CPU 91 (of controller 6) measures (or receives) the temperature of the central heating element 45*a* with the central heater temperature sensor 62*a*. The CPU 91 also measures (or receives) the temperature of the second end heating element 45*b*2 with the end heater temperature sensor 62*b*. At the start-up of the fixing unit 30, the CPU 91 measures the temperature of the heating element group 45 with the heater temperature sensors 62. When the temperature of the heating element group 45 is lower than some predetermined temperature, the CPU 91 causes the heating element group 45 to generate heat for a short time. Thereafter, the CPU 91 starts a rotation of the pressing roller 30*p*. Due to the heat generated by the heating element group 45, the viscosity of the grease applied to the inner circumferential surface of the cylindrical film 35 decreases. This reduces friction between the heater unit 40 and the cylindrical film 35 at the start of the rotation of the pressing roller 30*p*.

The CPU 91 measures the temperature of the central portion (in the y direction) of the cylindrical film 35 with the central film temperature sensor 64*a*. The CPU 91 measures the temperature of the end portion (in the −y direction) of the cylindrical film 35 with the end film temperature sensor 64*b*. The temperature at the end of the cylindrical film 35 in the −y direction is considered equal to the temperature of the end of the cylindrical film 35 in the +y direction. The CPU 91 monitors the temperatures of the central portion and the end portion of the cylindrical film 35 during the operation of the fixing unit 30. The CPU 91 performs phase control or wave number control of the power supplied to the heating element group 45 with the central triac 96*a* and the end triac 96*b*. The CPU 91 controls energization of the central heating element 45*a* based on the temperature sensor measurement result from the central portion of the cylindrical film 35. The CPU 91 controls the energization of the first end heating element 45*b*1 and the second end heating element 45*b*2 based on the temperature sensor measurement result from the end portion of the cylindrical film 35.

Among the heating elements 45*a*, 45*b*1 and 45*b*2 at least the two heating elements 45*b*1 and 45*b*2 which are heated and controlled collectively by the CPU 91. The temperature sensors 62 include an end heater temperature sensor 62*b* for detecting the temperature of at least one of the two heating elements 45*b*1 or (in this instance, the second end heating element 45*b*2 is monitored).

Among the heating elements 45*a*, 45*b*1 and 45*b*2, the second end heating element 45*b*2 is disposed on one end portion in the longitudinal direction and the first end heating element 45*b*1 is disposed on the other end portion in the longitudinal direction. The temperature sensors 62*b* and 64*b* are disposed on the same end as the second end heating element 45*b*2. No temperature sensors are disposed on the same end as the first end heating element 45*b*1.

Next, a locking state of the heater unit 40 according to the embodiment will be described.

Figure 8:
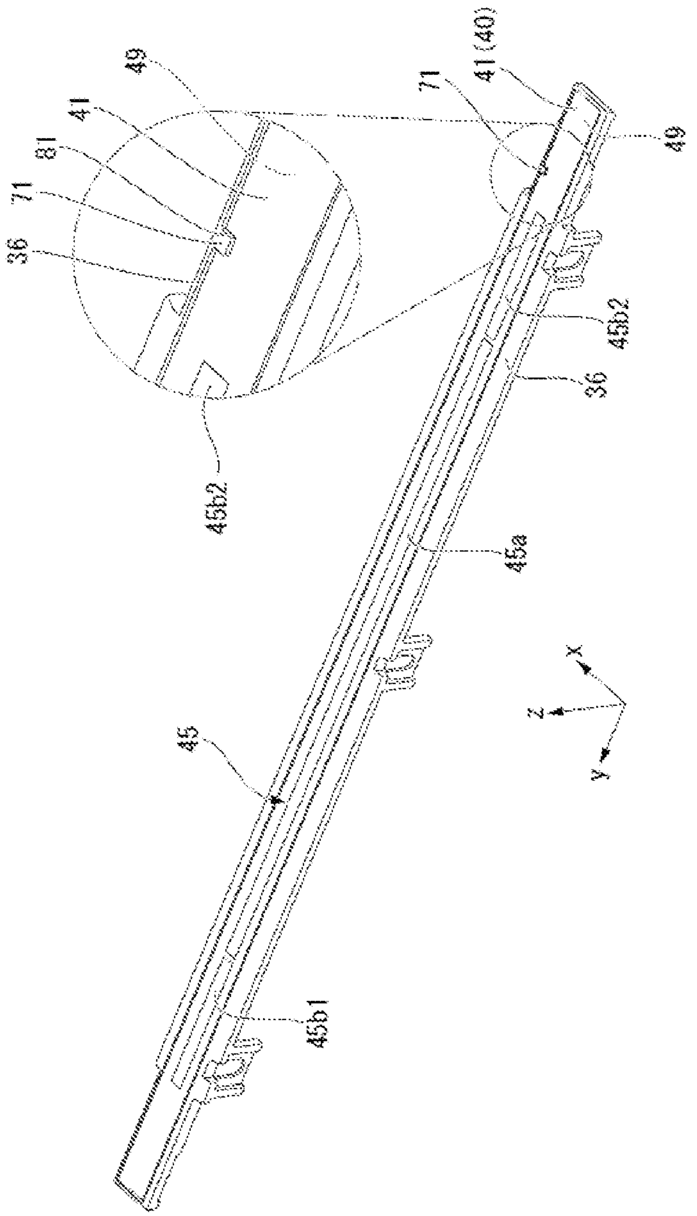
FIG. 8 is a perspective view for explaining aspects related to a locked state of a heater unit according to an embodiment.

As shown in FIG. 8, the substrate 41 of the heater unit 40 is engaged/locked in the y direction (longitudinal direction) with the support member 36. The support member 36 has a first locking portion 71 that locks the substrate 41 in the y direction. The first locking portion 71 is disposed on the −y direction side of the second end heating element 45*b*2. The first locking portion 71 is disposed on the same side as the end heater temperature sensor 62*b* (see FIG. 10). The first locking portion 71 is disposed on the −x direction side of the supporting member 36. The first locking portion 71 is a protruding portion that protrudes in the −x direction from an edge on the +x direction side of the supporting member 36. When viewed from the z direction, the first locking portion 71 has a rectangular shape. It is preferable that the height of the first locking portion 71 in the z direction is greater than or equal to the thickness of the substrate 41.

The substrate 41 has a first locked portion 81 that is engaged by the first locking portion 71. The first locked portion 81 is disposed on the −y direction side of the second end heating element 45*b*2. The first locked portion 81 is disposed on the +x direction edge of the substrate 41. The first locked portion 81 is a recessed portion that is recessed in the −x direction from the +x direction side edge of the substrate 41. When viewed from the z direction, the first locked portion 81 overlaps with the first locking portion 71. When viewed from the z direction, the first locked portion 81 has a rectangular shape.

Figure 9:
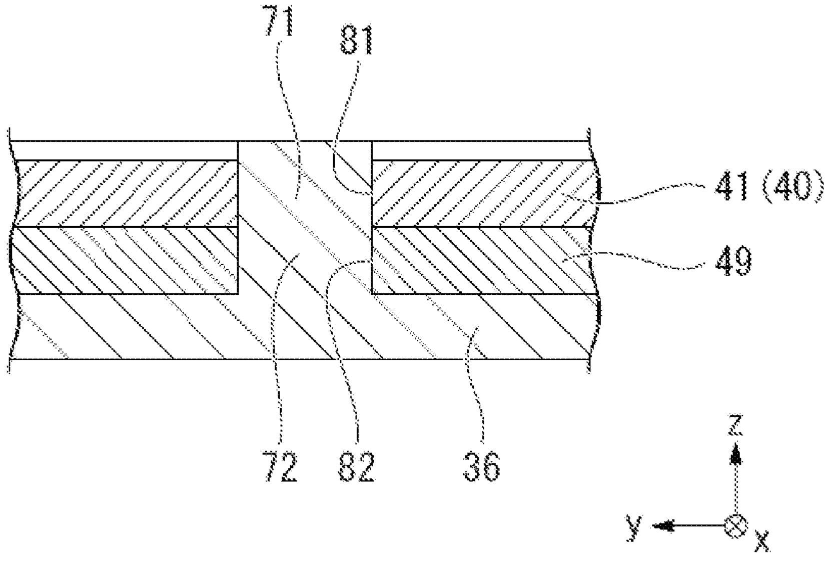
FIG. 9 is a cross-sectional view for explaining aspects related to a locked state of a heater unit according to an embodiment.

As shown in FIG. 9, the heat conductor 49 is locked in the y direction to the support member 36. The support member 36 has a second locking portion 72 that acts to lock the heat conductor 49 in the y direction. The heater unit 40 and the heat conductor 49 are locked in the longitudinal direction with respect to the supporting member 36 by the first locking portion 71 and the second locking portion 72. When viewed from the z direction, the second locking portion 72 overlaps with the first locking portion 71. That is, the second locking portion 72 is disposed at the same position as the first locking portion 71 in the x direction and the y direction. The second locking portion 72 is a convex portion having a rectangular shape similar to that of the first locking portion 71. For example, the second locking portion 72 is integrally formed with the support member 36 like the first locking portion 71. The height of the second locking portion 72 in the z direction is preferably equal to or greater than the thickness of the heat conductor 49.

The heat conductor 49 has a second locked portion 82 that is engaged by the second locking portion 72. When viewed from the z direction, the second locked portion 82 overlaps with the first locked portion 81. That is, the second locked portion 82 is disposed at the same position as the first locked portion 81 in the x direction and the y direction. The second locked portion 82 is a rectangular recessed portion similar to that of the first locked portion 81.

Figure 10:
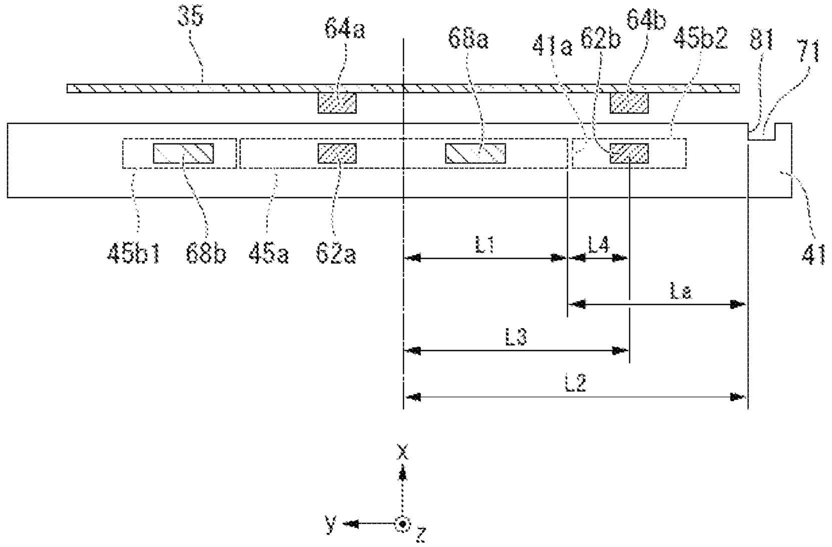
FIG. 10 depicts aspects related to a locking position of a heater unit according to an embodiment.

A locking position of the heater unit 40 of the embodiment will be described with reference to FIG. 10.

Here, the position at which the substrate 41 overlaps the central heating element 45*a* when viewed from the z direction is referred to as a "separation position 41*a*". The displacement ΔLa along the y direction of the separation position 41*a* due to the thermal expansion of the substrate 41 can be calculated by the following equation (1):

$$\Delta La = \alpha \times La \times \Delta T \tag{1}$$

In the above equation (1), α is a linear expansion coefficient, La is distance from the +y direction end in the of the first locking portion 71 (or alternatively, the first locked portion 81) to the separation position 41*a*, and ΔT is the temperature difference of interest.

In the embodiment, the substrate 41 is formed of stainless steel (e.g., SUS 304 with a linear expansion coefficient $\alpha = 17.3 \times 10^{-6}/°$ C.). The distance L1 along the y direction from the central position of the central heating element 45*a* to the separation position 41*a* is 120 mm. The distance L2 along the y direction from the central position of the central heating element 45*a* to the +y direction end portion of the first locking portion 71 is 180 mm.

To accommodate various sheet S sizes, it is preferable that the end heater temperature sensor 62*b* and the end film temperature sensor 64*b* are disposed closer in the y direction to the center of the second end heating element 45*b*2. In the embodiment, the distance L3 along the y direction from the center position of the central heating element 45*a* to the central position of the end heater temperature sensor 62*b* (alternatively, end film temperature sensor 64*b*) is 120.8 mm. That is, the distance L4 along the y direction from the separation position 41*a* to the center position of the end heater temperature sensor 62*b* (or end film temperature sensor 64*b*) is 0.8 mm.

The temperature of substrate 41 rises from about room temperature 20° C. to about 230° C. during heating associated with printing operations.

When the above conditions are substituted into the above equation (1), ΔLa becomes the following:

$$\begin{aligned}\Delta La &= 17.3 \times 10^{-6}/° \text{ C.} \times (180 - 120) \text{ mm} \times (230 - 20)° \text{ C.} \\ &= 0.21798 \text{ mm}\end{aligned}$$

That is, ΔLa is about 0.22 mm. Thus, the separation position 41*a* is displaced by about 0.22 mm in the +y direction, with the first locking portion 71 as the base point, due to the thermal expansion of the substrate 41. As described above, the end heater temperature sensor 62*b* is supported by being mounted on a surface of the support member 36. The end film temperature sensor 64*b* is disposed inside the region surrounded by the cylindrical film 35 and on the +x direction side of the heater unit 40. It is assumed here that the end heater temperature sensor 62*b* and the end film temperature sensor 64*b* are not substantially displaced along the y direction due to the thermal expansion of the substrate 41.

In the present embodiment, even if the substrate 41 thermally expands, the end heater temperature sensor 62*b* (alternatively, end film temperature sensor 64*b*) will still be located within a range along the y direction dimension of the second end heating element 45*b*2. For this reason, the temperature of the second end heating element 45*b*2 can still be accurately measured by the end heater temperature sensor 62*b*.

Figure 11:
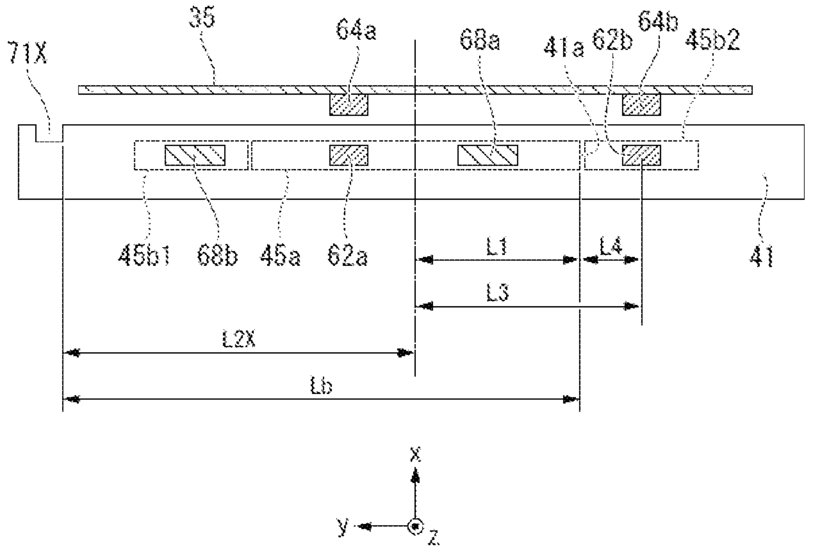
FIG. 11 depicts aspects related to a locking position of a heater unit of a comparative example.

Next, a locking position of the heater unit according to a comparative example will be described with reference to FIG. 11.

In the comparative example, a first locking portion 71X is disposed to the +y direction side of the first end heating element 45*b*1. That is, in the comparative example, the first locking portion 71X is disposed on the y-direction end opposite to the first locking portion 71 of the above example embodiment. In the comparative example, a distance L2X along the y direction from the central position of the central heating element 45*a* to the −y direction end portion of the first locking portion 71X is 180 mm. In the comparative example, the other condition values are the same as those in the above example embodiment.

In the comparative example, the displacement amount ΔLb along the y direction of the separator position 41*a* due to the thermal expansion of the substrate 41 is calculated by the following equation (2):

$$\Delta Lb = \alpha \times Lb \times \Delta T \tag{2}$$

In the above equation (2), α is again the linear expansion coefficient, Lb is the distance from the −y direction end of the first locking portion 71X to the separation position 41*a*, and ΔT is temperature difference of interest.

When the above comparative conditions apply in equation (2), ΔLb is the following:

$$\Delta Lb = 17.3\times10^{-6}/^\circ\text{ C.}\times(180+120)\text{ mm}\times(230-20)^\circ\text{ C.} = 1.08990\text{ mm}$$

That is, ΔLb is about 1.09 mm. Thus, the separation position 41*a* is displaced about 1.09 mm in the −y direction, with the first locking portion 71X as the base point, due to the thermal expansion of the substrate 41. In the comparative example, it is again assumed that the end heater temperature sensor 62*b* and the end film temperature sensor 64*b* are not substantially displaced along the y direction due to the thermal expansion of the substrate 41.

As described above, the distance L4 is 0.8 mm. In the comparative example, when the substrate 41 is thermally expanded, ΔLb (which is about 1.09 mm) is greater than the distance L4. That is, in the comparative example, when the substrate 41 thermally expands, the end heater temperature sensor 62*b* (or alternatively end film temperature sensor 64*b*) is located within the in the y direction range of the central heating element 45*a*, instead of the range of the second end heating element 45*b*2. Therefore, it is not possible to accurately measure the temperature of the second end heating element 45*b*2 with the end heater temperature sensor 62*b* in the comparative example.

As described above, a fixing unit 30 of an embodiment includes the cylindrical film 35, the heater unit 40, the support member 36, the heating elements 45*a*, 45*b*1 and 45*b*2, the end temperature sensors 62*b* and 64*b*, and the first locking portion 71. The cylindrical film 35 is formed in a loop or belt shape. The heater unit 40 is disposed inside the interior region surrounded by the cylindrical film 35. In the heater unit 40, the axial direction of the cylindrical film 35 corresponds to the longitudinal direction. The heater unit 40 has a first surface 40*a* abutting against an inner surface of the cylindrical film 35. The support member 36 supports the heater unit 40. The heating elements 45*b*1 and 45*b*2 are disposed in the heater unit 40 along the axial direction of the cylindrical film 35. The temperature sensors 62*b* and 64*b* are disposed on end along the longitudinal/axial direction. The first locking portion 71 is formed beyond the heating element 45*b*2 in the axial/longitudinal direction. The first locking portion 71 locks the heater unit 40 in the longitudinal direction with respect to the support member 36.

According to the above-described configuration, the following effects are obtained. The first locking portion 71 is disposed on the same end as the temperature sensors 62*b* and 64*b* in the longitudinal direction. Therefore, even if the heater unit 40 thermally expands, the temperature sensor 62*b* and 64*b* can still accurately measure the heating temperature of the intended end locations. Therefore, the heating temperature(s) can be appropriately controlled.

The heating elements 45*a*, 45*b*1 and 45*b*2 are arranged side by side in the longitudinal direction. According to the above-described configuration, the following effects are obtained. The heating temperature can be appropriately controlled in accordance with various sheet sizes.

The plurality of heating elements (e.g., 45*a*, 45*b*1 and include at least two heating elements (45*b*1 and 45*b*2) that are heated and controlled collectively by the controller 6. One heating control temperature sensor 62*b* is provided for detecting the temperature of one of the two heating elements 45*b*1 and 45*b*2. The first locking portion 71 is disposed on the same side/end as the heating control temperature sensor 62*b*.

According to the above-described configuration, the following effects are obtained. Since the first locking portion 71 is disposed on same side as the second end heating element 45*b*2 and the temperature sensor 62*b* used for the heating control, even when the heater unit 40 thermally expands, the temperature sensor 62*b* can accurately measure the temperature of the second end heating element 45*b*2. Therefore, the heating temperature can still be appropriately controlled at a range of different operating temperatures.

The plurality of heating elements (45*a*, 45*b*1 and 45*b*2) include a second end heating element 45*b*2 disposed on one end in the longitudinal direction. An end heater temperature sensor 62*b* disposed on the second end heating element 45*b*2, and an end film temperature sensor 64*b* abuts the cylindrical film 35 on the same end in the longitudinal direction.

According to the above-described configuration, the following effects are obtained. Even if the heater unit 40 thermally expands, the temperature of the second end heating element 45*b*2 can be accurately measured by the end heater temperature sensor 62*b*. Therefore, in a configuration in which the end heater temperature sensor 62*b* and the end film temperature sensor 64*b* are located on the same end in the longitudinal direction, the heating temperature may be appropriately controlled.

The plurality of heating elements (45*a*, 45*b*1 and 45*b*2) includes the other end heating element 45*b*1 disposed on the opposite end, in the longitudinal direction, of the end heating element 45*b*2. No temperature sensors are disposed on this other end with the heat generating element 45*b*1.

According to the above-described configuration, the following effects are obtained. Since the number of installed temperature sensors can be reduced, this contributes to a reduction in cost.

The fixing unit 30 has a controller 6 for controlling heat generation by the plurality of heating elements (45*a*, 45*b*1 and 45*b*2). The controller 6 controls the heat generation of the second end heating element 45*b*2 based on outputs from the temperature sensors 62*b* and 64*b* when heating the sheet S being past the heater unit 40 in the y-direction (short-dimension direction) while in contact with the outer surface of the cylindrical film 35.

According to the above-described configuration, the following effects are obtained. The controller 6 controls the heat generation of the second end heating element 45*b*2 on the same end as the temperature sensors 62*b* and 64*b* in the longitudinal direction. The first locking portion 71 is disposed on same end as the second end heating element 45*b*2 with the temperature sensors 62*b* and 64*b* used in the heating control. Therefore, even when the heater unit 40 thermally expands, the temperature sensor 62*b* and the temperature sensor 64*b* can still accurately measure the temperature of the second end heating element 45*b*2. Therefore, the heating temperature can be appropriately controlled.

The fixing unit 30 has a heat conductor 49 that abuts against a second surface 40*b* of the heater unit 40. The heater unit 40 and the heat conductor 49 are locked in the longitudinal direction with respect to the supporting member 36 by the locking portions 71 and 72.

According to the above-described configuration, the following effects are obtained. The heater unit 40 and the heat conductor 49 are less likely to be displaced in the longitudinal direction from each other. Therefore, it is possible to suppress variation in the temperature distribution of the heater unit 40 in the longitudinal direction. In addition, the configuration can be simplified as compared to a case where the heater unit 40 and the heat conductor 49 are respectively locked in the longitudinal direction by two different locking portions.

The image forming apparatus 1 according to an embodiment includes the fixing unit 30 as described above.

The fixing unit 30 is capable of appropriately controlling the heating temperature. Therefore, the image forming apparatus 1 can improve image quality.

Next, a modified example of the embodiment will be described.

Figure 12:
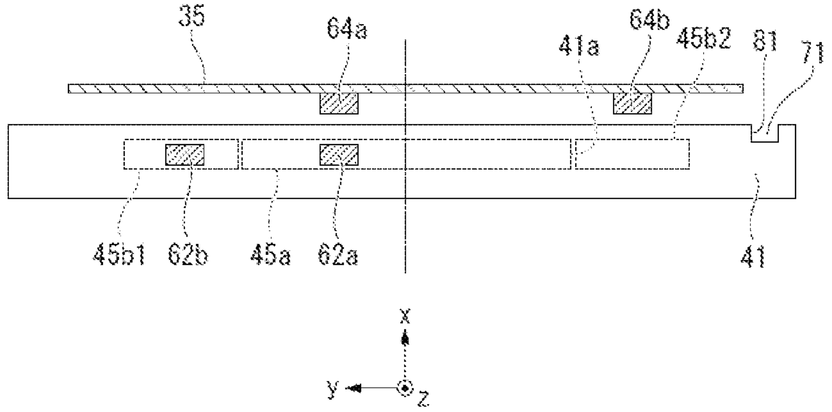
FIG. 12 depicts aspects related to an arrangement position of an end heater temperature sensor and an end film temperature sensor according to a modified example.

In the above-described embodiment, the end heater temperature sensor 62*b* and the end film temperature sensor 64*b* are both located on the same end in the longitudinal direction. On the other hand, in a modification example of the present disclosure, the end heater temperature sensor 62*b* and the end film temperature sensor 64*b* may be located at opposite ends in the longitudinal direction to each other (see FIG. 12). Note, in FIG. 12, illustration of the central thermostat 68*a*, the end thermostat 68*b*, and other aspects is omitted. For example, the end film temperature sensor 64*b* may be positioned on one end in the longitudinal direction, and the end heater temperature sensor 62*b* may be located on the other end in the longitudinal direction. In this case, the first locking portion 71 may be disposed on the same end of the end film temperature sensor 64*b* that is used for heating control in the longitudinal direction.

The second locking portion 72 of the above-described embodiment overlaps the first locking portion 71 when viewed from the z direction. On the other hand, the second locking portion 72 does not necessarily have to overlap the first locking portion 71 when viewed from the z direction. That is, the second locking portion 72 may be disposed at a position different from that of the first locking portion 71 in the x direction and the y direction. For example, the second locking portion 72 may be a convex portion having a shape that is different from that of the first locking portion 71. For example, the second locking portion 72 may be formed of a member different from that of the first locking portion 71. In some examples, the support member 36 may not include a second locking portion 72 for locking the heat conductor 49 in the y direction.

The first locking portion 71 of the above-described embodiment is a protruding portion that protrudes in the −x direction from the +x direction edge of the supporting member 36. In other examples, the first locking portion 71 may be a convex portion that protrudes in the +x direction from the −x direction edge of the supporting member 36. In some examples, the first locking portion 71 may have a shape other than a rectangular shape, such as a triangular shape when viewed from the z direction. For example, the arrangement and shape of the first locking portion 71 may be changed in accordance with required specifications. The arrangement and shape of the second locking portion 72 can also be changed in accordance with required specifications, similarly to the first locking portion 71.

The heating element group 45 according to the example embodiment includes three heating elements (a central heating element 45*a*, a first end heating element 45*b*1, and a second end heating element 45*b*2). However, the number of heating elements included in the heating element group 45 may be any number and is not limited to three.

The plurality of heater temperature sensors 62 of the example embodiment includes two heater temperature sensors (a central heater temperature sensor 62*a* and an end heater temperature sensor 62*b*). However, the number of temperature sensors 62 may be three or more.

The plurality of thermostats 68 of the example embodiment includes two thermostats (a central thermostat 68*a* and an end thermostat 68*b*). However, the number of thermostats 68 may be three or more in other examples.

The image processing apparatus according to the above-described embodiment is an image forming apparatus 1, and the fixing unit 30 is an example of a heating unit. However, in other examples, the image processing apparatus may be a decoloring apparatus, and the heating unit may be a decoloring unit instead of a fixing unit 30. A decoloring device performs a process of erasing an image formed on a sheet in a decoloring toner. The decoloring unit heats a decolorable toner image formed on the sheet passing through the nip, which erases (decolors) the image on the sheet.

According to at least one of the above-described embodiments, the temperature sensors 62*b* and 64*b* are disposed on same end side in the longitudinal direction. The first locking portion 71 is formed on the same end side as the heating element 45*b*2. The first locking portion 71 locks the heater unit 40 in the longitudinal direction with respect to the support member 36. Accordingly, it is possible to appropriately control the heating temperature.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed:

1. A heating unit, comprising:

a cylindrical film having a length in a first direction and configured to rotate about an axis parallel to the first direction;

a heater extending in the first direction and having a first surface abutting on an inner surface of the cylindrical film and a second surface opposite to the first surface;

a support member on the second surface of the heater;

a pair of first heating elements in the heater at a pair of first positions spaced from each other along the first direction, each first heating element extending in the first direction over a first range;

a second heating element in the heater at a second position between the pair of first positions along the first direction, the second heating element extending in the first direction over a second range not overlapping with the first range of either one of the pair of first heating elements;

a first temperature sensor above one of the pair of first positions in a second direction orthogonal to the first direction; and a rectangular portion of the heater at a third position along the first direction, the rectangular portion configured to engage a portion of the support member and restrict movement of the heater relative to the support member in the first direction, wherein the one of the pair of first positions is proximate to a first outer edge of the cylindrical film, the second position is closer to a central portion of the cylindrical film than the first outer edge of the cylindrical film, and the one of the pair of first positions is between the second and third positions in the first direction.

2. The heating unit according to claim 1, further comprising:

a third heating element in the heater at a fourth position along the first direction spaced from the second position, wherein the fourth position is closer to a second outer edge of the cylindrical film opposite of the first outer edge in the first direction than to the first outer edge.

3. The heating unit according to claim 1, further comprising:

a second temperature sensor above the second position in the second direction.

4. The heating unit according to claim 1, wherein the rectangular portion is a recessed portion of the heater, the recessed portion extending in a direction orthogonal to the first and second directions.

5. The heating unit according to claim 1, wherein the heater comprises:

a substrate having a first substrate surface on which the second heating element and the pair of first heating elements are disposed and a second substrate surface opposite the first substrate surface on which the first temperature sensor is disposed; and a protective layer covering the second heating element and the pair of first heating elements on the first substrate surface and contacting the inner surface of the cylindrical film.

6. The heating unit according to claim 5, wherein the substrate extends in the first direction beyond the outer edge of the cylindrical film, the rectangular portion is formed in a portion of the substrate beyond the outer edge of the cylindrical film in the first direction.

7. The heating unit according to claim 6, wherein the rectangular portion is a recessed portion formed in an edge surface of the substrate.

8. The heating unit according to claim 7, wherein the recessed portion is a rectangular-shaped groove.

9. The heating unit according to claim 6, wherein the heater further comprises:

an insulating film between the first substrate surface and the pair of first heating elements and between the first substrate surface and the second heating element.

10. The heating unit according to claim 1, further comprising:

a metal plate contacting the second surface of the substrate, the metal plate being between the second surface and the support member.

11. The heating unit according to claim 10, wherein the metal plate includes a rectangular portion corresponding in position to the rectangular portion of the heater, the rectangular portion of the metal plate is configured to engage a portion of the support member and restrict movement of the metal plate relative to the support member in the first direction, and the rectangular portion of the metal plate and the heater have substantially the same shape as one another.

12. The heating unit according to claim 1, further comprising:

a controller configured to control the pair of first heating elements according to a temperature detected by the first temperature sensor.

13. A heating unit, comprising:

a cylindrical film having a length in a first direction and configured to rotate about an axis parallel to the first direction;

a heater extending in the first direction and having a first surface abutting on an inner surface of the cylindrical film and a second surface opposite to the first surface;

a support member on the second surface of the heater;

a plurality of heating elements in the heater spaced from each other in the first direction, the plurality of heating elements including:

a first heating element at a first end position along the first direction, a second heating element at a second end position along the first direction, and a third heating element at a central position along the first direction between the first and second end positions;

a first temperature sensor above just the first end position in a second direction orthogonal to the first direction; and a rectangular portion of the heater that is configured to engage a portion of the support member and restrict movement of the heater relative to the support member in the first direction, wherein the first end position is between a position of the rectangular portion and the central position in the first direction.

14. The heating unit according to claim 13, further comprising:

a metal plate contacting the second surface of the substrate, the metal plate being between the second surface and the support member, wherein the metal plate includes a rectangular portion corresponding in position to the rectangular portion of the heater, and the rectangular portion of the metal plate is configured to engage a portion of the support member and restrict movement of the metal plate relative to the support member in the first direction.

15. The heating unit according to claim 14, wherein the rectangular portions of the metal plate and the heater have substantially the same shape as one another.

16. The heating unit according to claim 13, wherein the heater has only a single rectangular portion thereon.

17. The heating unit according to claim 13, further comprising a controller configured to control the first and second heating elements according to a temperature detected by the first temperature sensor.

18. The heating unit according to claim 17, wherein the controls the first and second heating elements according to just the temperature detected by the first temperature sensor.

19. The heating unit according to claim 13, wherein the rectangular portion is a recessed portion of the heater, the recessed portion extending in a direction orthogonal to the first and second directions.

20. The heating unit according to claim 13, further comprising:

a second temperature sensor above the central position in the second direction.

* * * * *